United States Patent [19]
Ishida

[11] Patent Number: 5,527,176
[45] Date of Patent: Jun. 18, 1996

[54] PELLETIZER

[75] Inventor: Yasuhiko Ishida, Hiroshima, Japan

[73] Assignee: The Japan Steel Works, Ltd., Tokyo, Japan

[21] Appl. No.: 336,112

[22] Filed: Nov. 4, 1994

[30] Foreign Application Priority Data

Nov. 8, 1993 [JP] Japan .................. 5-278044

[51] Int. Cl.$^6$ .................. B26D 5/04; B29B 9/06
[52] U.S. Cl. .................. 425/142; 83/675; 83/913; 264/142; 264/143; 425/311; 425/313; 425/DIG. 230
[58] Field of Search .................. 425/142, 308, 425/310, 311, 313, DIG. 230; 264/141, 142, 143, 148; 83/675, 913

[56] References Cited

U.S. PATENT DOCUMENTS

| | | |
|---|---|---|
| 3,590,678 | 7/1971 | Hasten et al. . |
| 3,685,751 | 8/1972 | Anders .................. 425/311 |
| 4,046,497 | 9/1977 | Newman, Jr. . |
| 4,500,271 | 2/1985 | Smith .................. 425/313 |
| 4,529,370 | 7/1985 | Holmes et al. .................. 425/313 |
| 5,435,713 | 7/1995 | Yamasaki et al. .................. 425/DIG. 230 |

FOREIGN PATENT DOCUMENTS 4239972  6/1993  Germany .................. 425/311

OTHER PUBLICATIONS

JP-A-63 069 607, Mar. 29, 1988, *Abstract.
SU-A-265 419, Jan. 7, 1983, *Abstract.
SU-A-250 428, Jan. 7, 1983, *Abstract.

*Primary Examiner*—Jay H. Woo
*Assistant Examiner*—Joseph Leyson
*Attorney, Agent, or Firm*—Sughrue, Mion, Zinn, Macpeak & Seas

[57] ABSTRACT

A pelletizer for plastics a braking unit including has a brake drum disposed on a sleeve for holding a cuttler drive shaft and a diaphragm disposed on a housing. The brakes unit both biasing and axial movement of cutter knives to a die surface through the sleeve by controlling a pressure of the diaphragm, so that a longer life of the cutter knives, ensured cutting of resin, and use of cutter knives made of an inexpensive material can be achieved.

4 Claims, 3 Drawing Sheets

PELLETIZER

BACKGROUND OF THE INVENTION

1. Field of the Invention

The invention relates to the pelletizing of plastics and, more particularly, to a novel improvement for achieving, e.g., a longer life of a cutter knife, a biasing force exerted thereon is adjusted by a pressure medium.

2. Related Art

A variety of pelletizer for plastics have conventionally been used. A typical one is disclosed in U.S. Pat. No. 5,190,768 whose construction is shown in FIG. 3.

In FIG. 3 reference numeral 1 designates a pelletizer, which is secured to a die surface 3a side of a die 3 through a cutter case 4 which houses a cutter 5. The die 3 is mounted on a manifold 2 so as to be in intimate contact therewith, the manifold 2 distributing molten resin extruded from an extruder (not shown) in the circumferential direction.

The die 3 is of the disk-like shape and has many nozzles 6, 6, . . . axially passing through the die in a ring-like area encircling the center of the die 3. One end of each nozzle 6 is opened toward a ring-like resin passage 2a of the manifold 2, and the other end thereof is opened within the cutter case 4.

One side of the cutter case 4 is releasably secured to the surface 3a side of the die 3 by bolts 7, and the pelletizer 1 is secured to the other side thereof by bolts 53. A cooling water inlet 8 is arranged at the lower portion of the cutter case 4, and a cooling water outlet 9 is arranged at the upper portion thereof, so that the cutter case 4 is filled with cooling water at all times.

In the pelletizer 1 is a sleeve 52. The sleeve 52 is contained in a housing 15 through an O ring 50 and a plurality of packings 51 so as to be movable by a predetermined distance in the axial direction. Within the sleeve 52 is a cutter drive shaft 12. The cutter drive shaft 12 is held through a pair of shaft sealing members 54 and a pair of bearings 55 so as to be rotatable coaxially and immovable in the axial direction (longitudinal direction) relative to the sleeve 52.

In cutter drive shaft 12, the cutter holder 10 is held at an end portion of the cutter drive shaft 12 projecting toward the inside of the cutter case 4 through a bolt 10a and a key 10b so as to be rotatable integrally with the cutter drive shaft 12 and releasable. A driving unit (not shown) is connected to the other end of the cutter drive shaft 12 through a shaft coupling (not shown) that is slidable in the axial direction.

On an end surface of the cutter holder 10 confronting the die 3 is a plurality of cutter knives 11, 11, . . . radially held. The cutter knives 11 are located so as to confront the die surface 3a of the die 3, i.e., the surface of the ring-like area on which the nozzles 6, 6, . . . are arranged.

The sleeve 52 forms a piston cylinder between a rear portion 15a of the housing 15 together with a rear cover 63 and a rear portion 52a of the sleeve 52 serving as a piston. A first gap chamber 56, which have a stroke value S, and a second gap chamber 57 formed on both sides of the rear portion 52a have a first hole 58 and a second hole 59, respectively, the holes 58, 59 communicate with the first gap chamber 56 and the second gap chamber 57, respectively. That is, the cutter drive shaft 12, the sleeve 52, and the housing 15 constitute a mechanism 100 for axially moving the cutter knives 11.

In the rear portion 52a of the sleeve 52 is a key 60. The key 60 that extends in the radial direction is projected outward while passing through a through groove 61 formed in the rear portion 15a of the housing 15. A detecting rod 62a of a detecting means 62 implemented by, e.g., a dial gage disposed on an outer surface 15b of the housing 15 is abutted against the key 60.

The ring-like rear cover 63 is attached to a rear end 15c of the housing 15 through bolts 64, and a stopper 66 having operation levers 65 is screwed to a screwing portion 63a formed on an inner diameter portion of the rear cover 63.

The stopper 66, when rotated to move in the axial direction, abuts against an adaptor 67 coupled to a rear end 52c of the sleeve 52 at a predetermined position, so that the stopper operation in the axial direction can be obtained.

Further, the first hole 58 is connected to a pressure medium source 69 through a first switching valve 70 and a first pressure adjusting valve 68, the pressure medium source 69 having a pressure medium such as compressed air or pressure oil. The second hole 59 is connected to the pressure medium source 69 through a second switching valve 72 and a second pressure adjusting valve 71. To monitor the pressure of the pressure medium supplied to the first hole 58 and the second hole 59, a pressure gage 73 is connected to each of the pressure adjusting valves 68, 71.

The conventional pelletizer for plastics is constructed as described above. A method of pelletizing plastics will now be described.

First, when the second switching valve 72 and the first switching valve 70 are set to the supply position and the discharge position, respectively, the sleeve 52 moves toward the die 3 within the housing 15 by the same action as the piston by the pressure medium supplied to the second gap chamber 57, biasing the cutter knives 11 onto the die surface 3a. This condition is set to zero at the detecting means 62.

When the cutter drive shaft 12 is rotated by the driving unit (not shown) under the above-mentioned condition, the cutter knives 11 are rotated at a high speed, causing the molten plastic (not shown) extruded out of the nozzles 6 to be cut into pellets by the respective cutter knives 11. The cut pellets are solidified by the cooling water supplied into the cutter case 4 from the cooling water inlet 8, and sent to a processing section (not shown) from the cooling water outlet 9 together with the cooling water. The pellets are dried and made into products at the processing section.

When the above-mentioned cutter knives 11 rotate within water, a thrust directed toward the die 3 (advancing thrust) is generated. While this thrust is changed in proportion to the number of rotations of the cutter knives 11, the thrust takes a significantly large value at normal high rotational speeds. Particularly, it is noted that in recently used large-capacity pelletizers 1 the cutter knives 11 tend to be operated at high rotational speeds, so that the generation of the thrust leads to an increase in the biasing force of the cutter knives 11 onto the die surface 3a, wearing the cutter knives 11 drastically.

Thus, with respect to the advancing thrust generated by the rotation of the cutter knives 11, the first switching valve 70 is switched to the supply side to supply the pressure medium to the first gap chamber 56, so that a force in such a direction as to cause the sleeve 52 to retreat against the thrust is exerted on the sleeve 52 to cancel out most of the advancing thrust.

That is, the setting of the first pressure adjusting valve 68 is set to a level higher than that of the second pressure adjusting valve 71 to cancel out most of the thrust, and the respective pressure adjusting valves 68, 71 are set so that the cutter knives 11 can bias the die surface 3a with a desired force with the remaining advancing thrust.

As a result of the above-mentioned operation, the cutter knives 11 are rotated while biased onto the die surface 3a with a desired weak biasing force at all times, allowing the molten plastic to be cut.

Further, how much each cutter knife 11 is worn can be observed from outside the pelletizer by reading the graduation on the detecting means 62.

Since the conventional pelletizer for plastics is constructed as described above, the following problems have been addressed.

In the conventional construction, when the molten resin exiting from the die is cut, the edge of each cutter knife is worn. Therefore, to ensure stable cutting, each cutter knife must always form a new edge by causing itself to come in contact with the die surface and to wear the edge thereof. However, the wearing speed of the cutter knife depends on the kinds of resins cut. As for some resins with which the wearing speed of the cutter knife is slow, in such a case, it is possible to slow the wearing speed and/or the cutter knife is not always biased in a period of some time.

However, with the above-mentioned conventional structure the thrust that biases the cutter knives onto the die surface is exerted at all times, so that the biasing of the cutter knives cannot be stopped.

In addition, in the above-mentioned conventional construction, the die surface and the cutter knives are brought into contact with each other by an appropriate biasing force at all times, and the cutter knives are rotated under this condition. Therefore, the die and the cutter knives must be made of excellent wear resistant materials. For example, an expensive material such as TIC (titanium carbide) is used. If the cutter knife is made of an inexpensive material such as stainless steel or machine tool steel, then the life of the cutter knife is shortened, and if the cutter knife biasing force is reduced to increase the life of the cutter knife, the cutter knife is bounced back by the resin extruded out of the die. This gives a gap between the die surface and the cutter knives, leading to defective cutting.

Further, the pressure of the cooling water within the cutter case is sometimes changed drastically (e.g., when the three-way valve in a cut pellets transport pipeline is switched). In such a case, a force in the retreating direction is exerted on the sleeve end surface exposed to the cutter case by the water pressure elevated at such instance to bounce back the cutter knives, which in turn forms a gap between the die surface and the cutter knives to cause defective cutting. Thus, in the case where a drastic change in the water pressure is likely to happen, it is necessary to set the pressure of the pressure medium to be supplied to the gap chamber for adjusting the advancing thrust to such a level as to increase the advancing thrust in advance. To increase the advancing thrust means that the cutter knives are biased onto the die surface with a force larger than necessary, and this accelerates the wearing speed of the cutter knives.

SUMMARY OF THE INVENTION

The invention has been made to overcome the above-mentioned problems. Accordingly, the object of the invention is particularly to provide a pelletizer for plastics capable of giving a long life to cutter knives and achieving stable pelletizing free from change in cooling water pressure and the like.

The invention is applied to a pelletizer for plastics that includes: a cutter holder having cutter knives, each being rotated along a die surface of a die; a cutter drive shaft for holding the cutter holder; a sleeve for internally holding the cutter drive shaft so as to be rotatable and immovable in an axial direction; and a housing for internally holding the sleeve, forming a piston cylinder by making a part of the sleeve serve as a piston, and allowing the cutter drive shaft to move in the axial direction. In such pelletizer a braking unit being operated by a pressure medium is disposed between the sleeve and the housing.

In more detail, the braking unit includes: a brake drum disposed on the sleeve, a pair of holders disposed above the brake drum, a diaphragm mounted on one holder, a brake shoe provided on the other holder at a position corresponding to the diaphragm, a switching valve for switching supply and discharge of the pressure to be supplied to the diaphragm; and a pressure adjusting valve for adjusting a pressure medium supplied to the diaphragm.

In the pelletizer for plastics of the invention, when the pressure medium is supplied to the diaphragm of the braking unit, the diaphragm expands to cause the diaphragm pressing the brake drum through the brake shoe. When the diaphragm and the brake drum are about to move relative to each other by pressing the diaphragm to the brake drum through the brake shoe; i.e., when the sleeve is about to move relative to the housing in the axial direction, frictional force is generated a both members are in contact, thereby lessening the relatively moving force or blocking the relative movement.

As the pressure of the pressure medium is adjusted, the urging pressure between the diaphragm and the brake drum is changed, which in turn adjusts the frictional force between both members. Therefore, the movement of the sleeve relative to the housing is blocked or the moving force is adjusted.

When the pressure medium is discharged from the diaphragm, the diaphragm contracts to disappear the urging pressure between the diaphragm and the brake drum. Therefore, the sleeve freely moves in the axial direction while released from the housing.

DETAILED DESCRIPTION OF THE PREFERRED EMBODIMENTS

Figure 1:
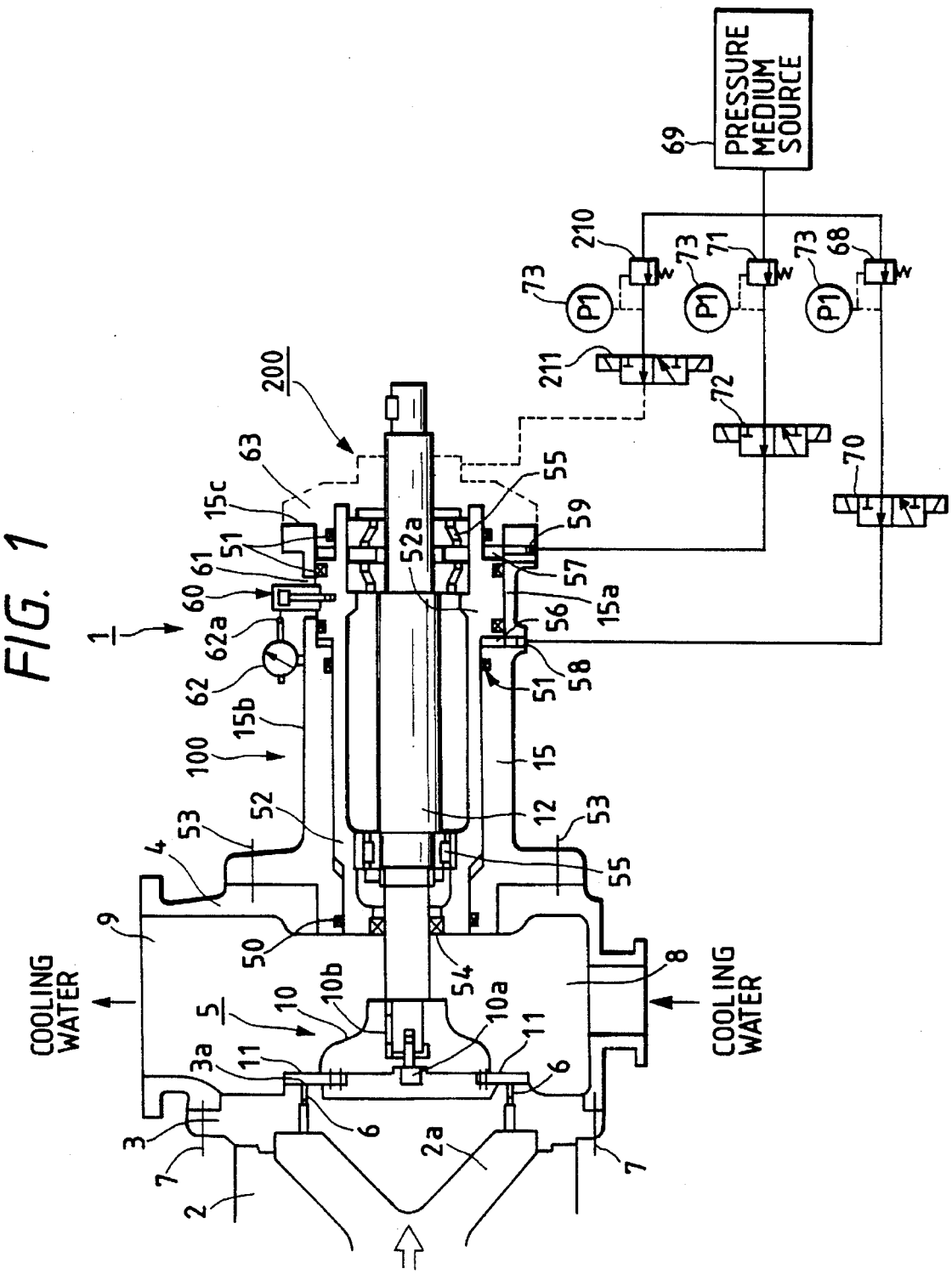
FIG. 1 is a sectional view showing the construction of a pelletizer for plastics of the invention.

A pelletizer for plastics, which is a preferred embodiment of the invention, will be described in detail with reference to the drawings.

The same or like parts and components as those of the conventional example will be designated by and described with the same reference numerals.

Figure 2:
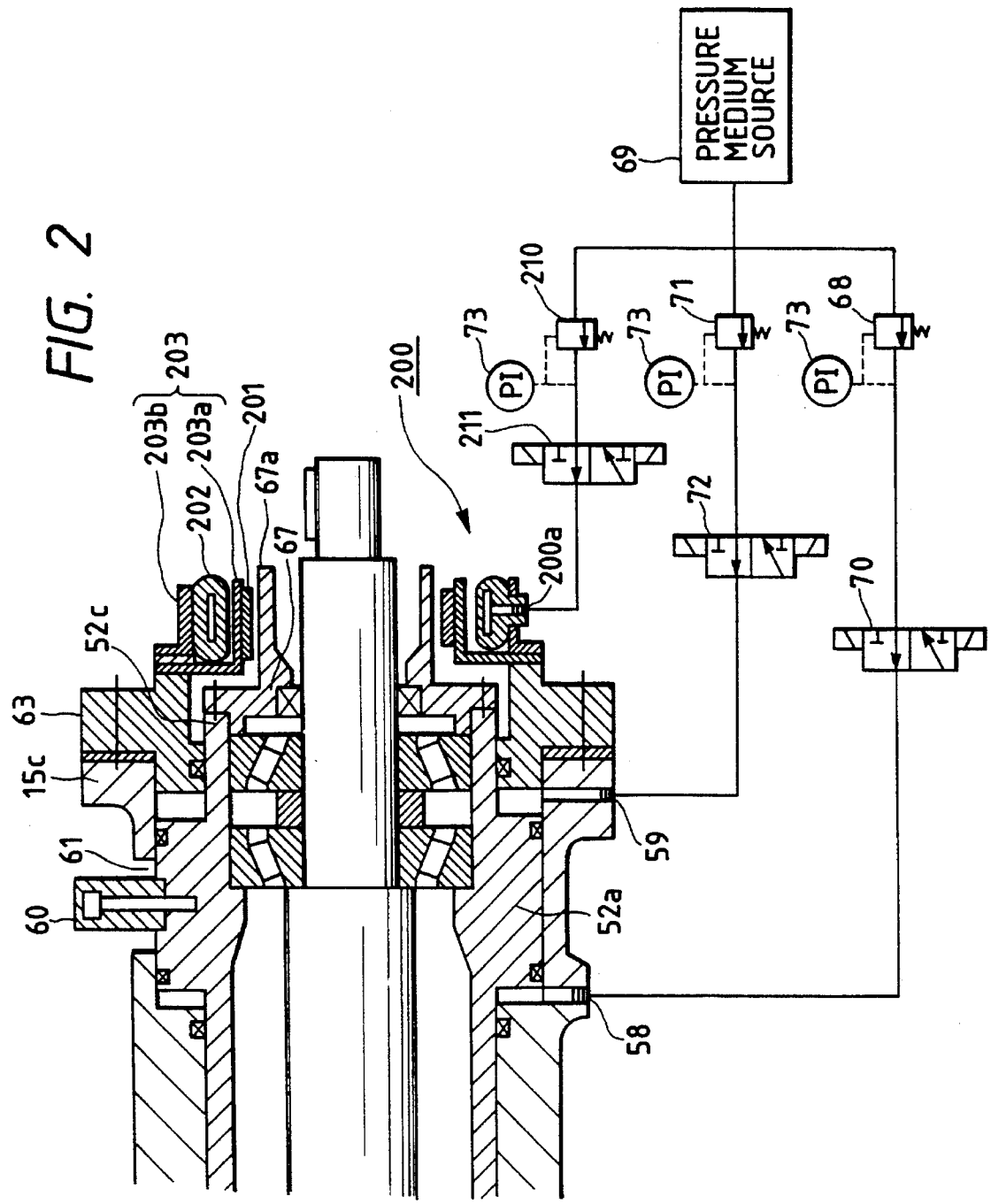
FIG. 2 is a detailed view showing the construction of the main portion of FIG. 1.
Figure 3:
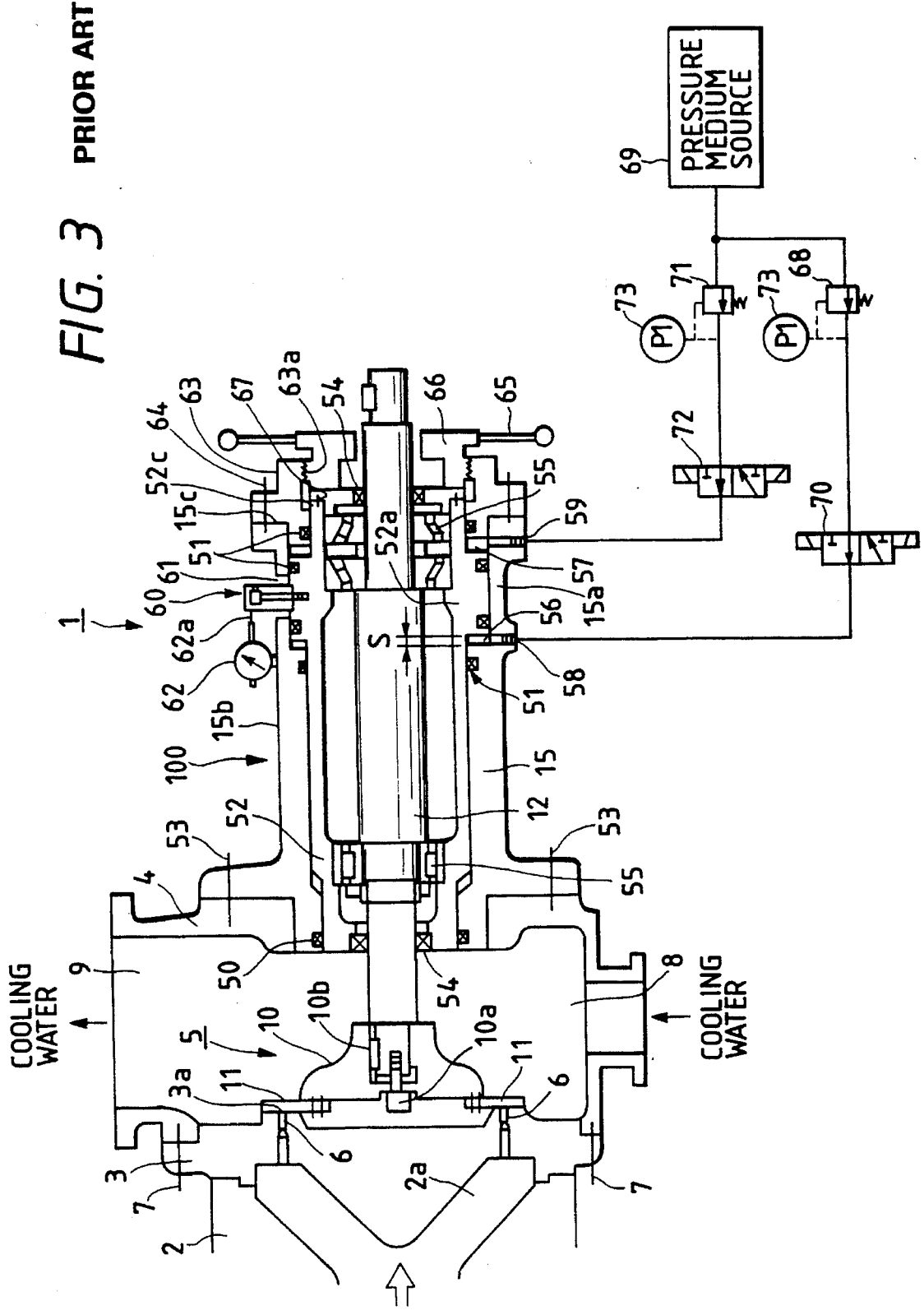
FIG. 3 is a sectional view showing the construction of a conventional pelletizer.

FIG. 1 is a partially sectional view showing the construction of a pelletizer for plastics of the invention; and FIG. 2 is a detailed view showing the construction of the main portion of FIG. 1.

In FIGS. 1 and 2 reference numeral 1 designates a pelletizer. The pelletizer 1 is secured to a die surface 3a side of a die 3 through a cutter case 4 which houses a cutter 5. The die 3 is mounted on a manifold 2 so as to be in intimate contact therewith, the manifold 2 distributing molten resin extruded from an extruder (not shown) in the circumferential direction.

The die 3 is of the disk-like shape and has a great number of nozzles 6, 6, . . . axially passing through the die in a ring-like area encircling the center of the die 3. One end of each nozzle 6 is opened toward a ring-like resin passage 2a of the manifold 2, and the other end thereof is opened within the cutter case 4.

One side of the cutter case 4 is releasably secured to the surface 3a side of the die 3 by bolts 7, and the pelletizer 1 is secured to the other side thereof by bolts 53. A cooling water inlet 8 is arranged at the lower portion of the cutter case 4, and a cooling water outlet 9 is arranged at the upper portion thereof, so that the cutter case 4 is filled with cooling water at all times.

In the pelletizer 1 is a sleeve 52. The sleeve 52 is contained in a housing 15 through an O ring 50 and a plurality of packings 51 so as to be movable by a predetermined distance in the axial direction. Within the sleeve 52 is a cutter drive shaft 12. The cutter drive shaft 12 is held through a pair of shaft sealing members 54 and a pair of bearings 55 so as to be rotatable coaxially and immovable in the axial direction (longitudinal direction) relative to the sleeve 52.

In the cutter drive shaft 12, the cutter holder 10 is held at an end portion of the cutter drive shaft 12 projecting toward the inside of the cutter case 4 through a bolt 10a and a key 10b so as to be rotatable integrally with the cutter drive shaft 12 and releasable. A driving unit (not shown) is connected to the other end of the cutter drive shaft 12 through a shaft coupling (not shown) that is slidable in the axial direction.

On an end surface of the cutter holder 10 confronting the die 3 are a plurality of cutter knives 11, 11, . . . radially held. The cutter knives 11 are located so as to confront the die surface 3a of the die 3, i.e., the surface of the ring-like area on which the nozzles 6, 6, . . . are arranged.

The sleeve 52 forms a piston cylinder between a rear portion 15a of the housing 15 together and a rear cover 63 and a rear portion 52a of the sleeve 52 serving as a piston. A first gap chamber 56 and a second gap chamber 57 formed on both sides of the rear portion 52a have a first hole 58 and a second hole 59, respectively, the holes 58, 59 communicate with the first gap chamber 56 and the second gap chamber 57, respectively. That is, the cutter drive shaft 12, the sleeve 52, and the housing 15 constitute a mechanism 100 for axially moving the cutter knives 11.

In the rear portion 52a of the sleeve 52 is a key 60. The key 60 that extends in the radial direction is projected outward while passing through a through groove 61 formed in the rear portion 15a of the housing 15. A detecting rod 62a of a detecting means 62 implemented by, e.g., a dial gage disposed on an outer surface 15b of the housing 15 is abutted against the key 60.

The bearing 55 that rotatably supports the cutter drive shaft 12 is contained in the rear portion 52a of the sleeve 52. An adaptor 67 for holding the bearing 55 in the sleeve 52 is secured to a rear end 52c.

As shown in FIG. 2, a cylindrical brake drum 67a is disposed at the rear portion of the adaptor 67.

Holders 203 are secured to the rear end of the rear cover 63. The holders 203 are located at the outer circumferential portion of the brake drum 67a so as to be distanced therefrom.

The holders 203 comprising an inner holder 203a and an outer holder 203b are arranged around the brake drum 67a in the radial direction thereof. In order to easily deform the inner holder toward an inside, the inner holder 203a is divided in a plurality of parts. A diaphragm 202 is integrally held at an inner circumference portion of the outer holder 203b. Therefore, the diaphragm 202 is arranged between the inner circumference portion of the outer holder 203b and an outer circumference portion of the inner holder 203a. The brake shoe 201 is integrally held to an inner circumference portion of the inner holder 203a in such a manner that a small gap exists between an inner circumference portion of the brake drum 67a and brake shoe 201.

The diaphragm 202 has a pressure medium supply/discharge hole 202a.

The supply/discharge hole 202a is connected to a pressure medium source that supplies a pressure medium such as compressed air or pressure oil through a third switching valve 211 and a third pressure adjusting valve 210. The third pressure adjusting valve 210 has a pressure gage 73 for monitoring the pressure of the pressure medium.

That is, the brake drum 67a, the brake shoe 201, the diaphragm 202, the holders 203a and 203b, the third switching valve 211, and the third pressure adjusting valve 210 constitute a braking unit 200.

Further, the first hole 58 is connected to the pressure medium source 69 through a first switching valve 70 and a first pressure adjusting valve 68. The second hole 59 is connected to the pressure medium source 69 through a second switching valve 72 and a second pressure adjusting valve 71. To monitor the pressure of the pressure medium supplied to the first hole 58 and the second hole 59, pressure gages 73 are connected to the pressure adjusting valves 68, 71, respectively.

While the pressure medium to be supplied to the braking unit 200 is obtained from the pressure medium source 69 for axially moving the sleeve 52 in the axial direction in this embodiment, the pressure medium source 69 is not necessarily shared in common; an independent pressure medium source may be used for the braking unit 200.

The pelletizer for plastics of the invention is constructed as described above. A method of pelletizing plastics will now be described.

First, when the second switching valve 72 and the first switching valve 70 are set to the supply position and the discharge position, respectively, the sleeve 52 moves toward the die 3 side within the housing 15 by the same action as the piston by the pressure medium supplied to the second gap chamber 57, biasing the cutter knives 11 onto the die surface 3a. This condition is set to zero at the detecting means 62.

When the cutter drive shaft 12 is rotated by the driving unit (not shown) under the above-mentioned condition, the cutter knives 11 are rotated at a high speed, causing the molten plastic (not shown) jetted out of the nozzles 6 to be cut into pellets by the respective cutter knives 11. The cut pellets are solidified by the cooling water supplied into the cutter case 4 from the cooling water inlet 8, and sent to a processing section (not shown) from the cooling water outlet 9 together with the cooling water. The pellets are dried and made into products in the processing section.

When the cutter knives 11 rotate within water, a thrust (advancing thrust) directed toward the die 2 is generated.

With respect to the advancing thrust acting on the sleeve 52 through the cutter drive shaft 12 by the rotation of the cutter knives 11, the first switching valve 70 is switched to the supply side to supply the pressure medium to the first gap chamber 56, so that a force in such a direction as to cause the sleeve 52 to retreat resisting the thrust is applied to the sleeve 52 to cancel out most of the advancing thrust.

That is, to cancel most of the advancing thrust generated by the rotation of the cutter knives 11, each adjusting pressure is set so that the first pressure adjusting valve 68 is set to a higher level than the second pressure adjusting valve 71.

From the above-mentioned operation, the cutter knives 11 rotate while biased onto the die surface 3a with a desired optimal weak biasing force at all times.

Then, with the cutter knives 11 rotating while biased onto the die surface 3a with the optimal biasing force, the third switching valve 211 is switched to the supply side to supply the pressure medium to the diaphragm 202.

The diaphragm 202 expands while elastically deformed by the pressure medium. When the sleeve 52 is about to move relative to the housing 15 with the brake shoe 201 coming in contact with the outer circumferential surface of the brake drum 67a, a frictional force is generated at a contact surface between the brake shoe 201 and the brake drum 67a, blocking the movement of the sleeve 52. The pressure of the pressure medium is changed by changing the setting of the third pressure adjusting valve 210. Therefore, by changing the frictional force at the contact surface, the force for blocking the movement of the sleeve 52 can be changed.

As is the case with the conventional example, when the movement blocking force of the braking unit 200 is set to a large value with the first pressure adjusting valve 68 and the second pressure adjusting valve 71 set so as to exert the optimal biasing force on the sleeve 52, the cutter knives 11 continue to rotate while held at the first position to which the cutter knives 11 are biased. The cutter knives 11 no longer advance to maintain the biasing force thereafter, rotating at a predetermined position.

In this case, the force for biasing the cutter knives 11 is gradually reduced by wear due to the cutter knives sliding with the die surface 3a so that the abrasion which occurs by sliding the die surface 3a and the cutter knives 11 is omitted. Since the braking unit 200 is blocking the axial movement of the sleeve 52, the cutter knives 11 are prevented from being bounced back or moving away from the die surface 3a by a drastic change of the cooling water pressure or by the force of extruding resin from the die 3.

Further, the movement blocking force of the braking unit 200 is set to a small value, and the sleeve 52 biasing force is set to a relatively large value.

In this case, the sleeve 52 advances with the advancing thrust being weakened. That is, the cutter knives 11 exert the optimal biasing force onto the die surface 3a at all times with the sleeve 52 receiving the large advancing thrust. Even in this case, the frictional force of the braking unit 200 prevents the cutter knives 11 from being bounced back or moving away from the die surface 3a.

When the third switching valve 211 is switched to the discharge side, the braking unit 200 is operated in such a manner that the diaphragm 202 contracts by discharging the pressure medium whose pressure has disappeared by elasticity and the brake shoe 201 moves away from the brake drum 67a.

The sleeve 52 advances or retreats only in accordance with the set values of the first pressure adjusting valve 68 and the second pressure adjusting valve 71 under this condition.

Since the pelletizer for plastics of the invention is constructed as described above, the following effect can be provided.

The cutter knives can be held with only a small or almost no biasing force onto the die surface, and are prevented from being bounced back by the resin pressure or moving away from the die surface by retreating due to a drastic change in the cooling water pressure.

As a result, the wearing speed of the cutter knives is decreased to increase the life thereof, which in turn decreases replacement frequency to increase the period between maintenances, thereby allowing a longer continuous pelletizing process to be achieved.

Further, even if the cutter knife is made of stainless steel or machine tool steel materials, the life thereof can be increased to a significant degree.

Still further, the contact between the cutter knives and the die surface is consistent at all times, so that the pelletizing conditions are consistent to reduce production of defects to a remarkable degree.

What is claimed is:

1. A pelletizer for plastics, comprising:
  a cutter holder having cutter knives, each of the cutter knives rotated along a die surface of a die;
  a cutter drive shaft for holding the cutter holder;
  a sleeve for internally holding the cutter drive shaft so as to be rotatable and immovable in an axial direction relative to the sleeve;
  a housing for internally holding the sleeve and for allowing the sleeve and in turn the cutter drive shaft to move in the axial direction relative to the housing; and
  a braking unit for suppressing axial movement of the sleeve and in turn the cutter drive shaft, the braking unit being disposed between the sleeve and the housing, the braking unit including:
  a brake drum disposed on the sleeve;
  a pair of holders disposed around the brake drum;
  a diaphragm mounted on one of the holders;
  a brake shoe provided on the other holder at a position corresponding to the diaphragm to allow the brake shoe to contact the brake drum when the diaphragm is expanded by a pressure medium.

2. A pelletizer for plastics, comprising:
  a cutter holder having cutter knives, each of the cutter knives rotated along a die surface of a die;
  a cutter drive shaft for holding the cutter holder;
  a sleeve for internally holding the cutter drive shaft so as to be rotatable and immovable in an axial direction relative to the sleeve;
  a housing for internally holding the sleeve and for allowing the sleeve and in turn the cutter drive shaft to move in the axial direction relative to the housing; and
  a braking unit for suppressing axial movement of the sleeve and in turn the cutter drive shaft, the braking unit being disposed between the sleeve and the housing, wherein the braking unit includes:
  a brake drum disposed on the sleeve;
  a pair of holders disposed around the brake drum;
  a diaphragm mounted on one of the holders;
  a brake shoe provided on the other holder at a position corresponding to the diaphragm to allow the brake shoe to contact the brake drum when the diaphragm is expanded by a pressure medium;

a switching valve for switching supply and discharge of the pressure medium to be supplied to the diaphragm; and a pressure adjusting valve for adjusting the pressure medium supplied to the diaphragm.

3. A pelletizer for plastics as claimed in claim 1, wherein a rear portion of the sleeve serves as a piston, the piston cooperating with a rear portion of the housing and a rear cover to form a pressure actuated piston cylinder arrangement for axially moving the cutter drive shaft together with the sleeve.

4. A pelletizer for plastics as claimed in claim 2, wherein a rear portion of the sleeve serves as a piston, the piston cooperating with a rear portion of the housing and a rear cover to form a pressure actuated piston cylinder arrangement for axially moving the cutter drive shaft together with the sleeve.

* * * * *